United States Patent [19]

Skylas

[11] Patent Number: 4,849,887

[45] Date of Patent: Jul. 18, 1989

[54] HORIZON VELOCITY ANALYSIS

[75] Inventor: Joseph J. Skylas, Houston, Tex.

[73] Assignee: Amoco Corporation, Chicago, Ill.

[21] Appl. No.: 90,981

[22] Filed: Aug. 28, 1987

[51] Int. Cl.⁴ .......................... G01V 1/36; G01V 1/34
[52] U.S. Cl. ...................................... 364/421; 367/52
[58] Field of Search .................... 367/38, 52; 364/421, 364/422

[56] References Cited

U.S. PATENT DOCUMENTS

| | | | |
|---|---|---|---|
| 4,577,298 | 3/1986 | Hinkley | 367/38 X |
| 4,594,691 | 6/1986 | Kimball et al. | 364/422 X |
| 4,646,239 | 2/1987 | Bodine et al. | 364/421 |
| 4,665,510 | 5/1987 | Foster et al. | 364/421 X |
| 4,698,793 | 10/1987 | Wu | 364/422 X |
| 4,713,775 | 12/1987 | Scott et al. | 364/421 X |

FOREIGN PATENT DOCUMENTS 0135623  4/1985  European Pat. Off. .

OTHER PUBLICATIONS

Toldi, J., "Velocity Analysis Without Picking", Stanford Exploration Project Report #41, 1984, 77–90.
Al-Chalabi, M., "Velocity Determination from Seismic Reflection Data", *Developments in Geophysical Exploration Methods—1*, A. A. Fitch, ed., Chapter 1, 1979.

Primary Examiner—Clark A. Jablon

[57] ABSTRACT

Traveltime and reflector position for horizons of interest are used to generate a lateral coherency display representative of a subterranean horizon. According to a particular aspect, the display can include assigning maximum coherency values of each subsurface reflector, a single display value selected to contrast with display values assigned to lesser values of coherency for each subsurface reflector. According to other aspects, the invention is employed in connection with normal moveout correction and statics correction of seismic data.

22 Claims, 6 Drawing Sheets

METHOD FOR EVALUATING STATICS ERRORS

HORIZON VELOCITY ANALYSIS

FIELD OF THE INVENTION

The invention relates to the processing and interpretation of seismic data. In one particular aspect, the invention relates to an improved method for determining velocities characteristic and representative of subterranean formations. In another aspect, the invention relates to a method which can be used for determining the existence and relative location in the subsurface of anomalies causing statics errors and for assessing effectiveness of statics correction.

SETTING OF THE INVENTION

In interpreting seismic data, velocity, in its various forms, is the parameter of greatest value to the explorationist. Accurate determinations of velocity require accurate identification in seismic traces of primary reflections against a background of noise and energy.

The common depth point (CDP) technique significantly contributes to identification of primary reflections against a background of noise and energy by acquiring multifold seismic data for locations in the subsurface by sampling them repeatedly, for example, by seismic initiations (shots) at different source locations while an array of receivers is stationary or is rolled along between the initiations. The result is a set of seismic traces which can be sorted by common subsurface locations (CDP) to produce CDP gathers, which can then be processed, for example, by normal moveout (NMO) correction, statics correction, and the like to produce processed CDP gathers which can be further processed to generate a stacked seismic section in the CDP-time domain. Velocity estimates made in various ways during processing can also be displayed in velocity displays. Since NMO correction and statics correction are widely and necessarily applied, errors in these corrections will have a negative effect on interval velocity and average velocity determinations.

In seismic prospecting, the term velocity refers to the propagation speed of the seismic wave, a property of the propagation medium. The term velocity analysis is commonly used to refer to the process of determining velocity from the stacking of CDP data. Often, the term is also used to refer to subsequent processing used for detailed velocity determinations. The stacking velocity required for velocity studies is that producing maximum coherency in the primary reflection data. Often, this velocity is known simply as the stacking velocity. It is, sometimes, also referred to as the moveout velocity, normal moveout velocity, CDP velocity, etc. This velocity can be conveniently referred to as maximum coherency stacking velocity (MCS velocity).

The MCS velocity has dimensions of velocity but is not directly physically meaningful. Exploration purposes, apart from data processing, require measures of velocity that are physically meaningful, such as average velocity and interval velocity. RMS velocity, which is a first approximation to the MCS velocity and is simply and directly related to interval and average velocities, provides a bridge between the MCS velocity and the interval and average velocities. When the measured MCS velocity value is inaccurate due to static correction errors or due to coherent and random noise, the inaccuracies are transmitted to the NMO corrections and to the estimates of the RMS, interval, and average velocities.

The Normal Moveout

The normal moveout (NMO) can be defined as the time shift that must be applied to a reflection time ($T_x$) of a seismic signal received by a receiver having offset X to reduce it to the time $T_0$ that would have been recorded at zero offset (normal incidence). Accordingly, the NMO can be given by $$\Delta T = T_x - T_0$$

For each trial stacking velocity, $V_s$, NMO corrections are applied to each of the traces of the CDP gather according to $$\Delta T = \left( T_0^2 + \frac{X^2}{V_s^2} \right)^{\frac{1}{2}} - T_0' \quad (1)$$

or a similar relationship.

This analysis, referred to as velocity analysis, conventionally consists of time shifting traces in a gather using assumed values of $V_s$ and T and evaluating the coherence of the resulting time shifted traces, i.e., the extent to which the different traces after time shifting are in-phase. Typically, a wide range of values for $V_s$ and virtually all T (traveltimes) of a CDP record, typically spanning about 6000 msec (milliseconds) must be evaluated. The evaluation can involve, for example, generating measures of coherency over a range of $V_s$ for a time T, then incrementing time T by typically 2-4 msec and again generating measures of coherency over a range of $V_s$ for the incremented time T, and continuing the process until the full range of seismic traveltimes is covered. Alternatively, the evaluation can involve, for example, generating measures of coherency over a range of $V_s$ over a range of time $T \pm t_g$ where $t_g$ can typically be about 24 msec, then incrementing T by $t_g$ and continuing the process until the full range of seismic traveltimes is covered. Both techniques are computer-usage intensive. For the former technique for a 6000 msec traveltime record on the order of 6000/4=1500 sets (assuming T is incremented by 4 msec intervals) of coherency values for ranges of $V_s$ must be evaluated and for the latter technique on the order of 6000/24 (assuming T is incremented by $t_g$=24 msec) sets of coherency values for ranges of $V_s$ must be evaluated for a typical seismic section. The results of the evaluation can then be displayed in velocity spectra with coherence represented as a dependent variable or with coherence contoured in the traveltime- stacking velocity domain.

A high value of coherency implies that similar energy is arriving on all of the traces and that the corresponding stacking velocity function will move the traces in-phase. In practice, a velocity spectrum is produced for each CDP gather and evaluated to determine which velocity function best aligns the seismic traces in the gather, that is, produces the maximum coherency. This time and effort intensive analysis is because of a general belief that is necessary to increment through both time and velocity variables at at least selected positions on the seismic line (selected CDP's) to determine stable coherent values.

Identification of the MCS velocity function thus conventionally requires comparison and analysis of multiple coherency displays in the time-velocity domain at intervals along the seismic line. Display of coherency data along the seismic line itself would facilitate analysis by displaying the coherency information in the same domain for which the velocities of interest will be determined.

Statics

Topographic features and subsurface inhomogeneities produce different time shifts in different traces of a CDP gather according to the details of each seismic ray-path trajectory from source to receiver. The most common source of such time shifts is thought to be due to errors in topographic correction or to variations in the near-surface, such as those due to variations in the sea-bed topography or in the weathering layer. Variations in recorded traveltimes due to topographic features can sometimes be readily corrected for, leaving residual static errors due to subsurface inhomogeneities. Deep sources of statics error, including facies changes, salt and shale masses, local gas accumulations, structural changes, ancient topography, and the like, may also be important. Most, if not all, statics correction programs currently in use assume the sources of statics error to be located in the near surface.

These time shifts, whether due to uncorrected topographic variation or to subsurface inhomogeneities, are referred to herein as statics, even though a given trace may not be shifted by the same amount along its entire length. Statics varying with a wavelength which is commensurate with the length of a seismic spread will significantly distort the reflection curvature in the CDP gather. When velocity spectra are produced in the time velocity domain at a number of positions along a seismic line in the conventional way, the velocity spectra displays will often show greatly varying MCS velocity values and magnitudes of coherency between successive points along the seismic spread or line.

The magnitude and width of the MCS velocity oscillations along seismic spreads vary from one area to another according to the details of any and all of the subsurface and surface inhomogeneities of the earth above the reflector. Typically, the oscillations (peak to trough) are about 5–10% of the true average velocity but oscillations reaching 30% or more are not uncommon. MCS velocity oscillations due to laterally variable time delays are generally the largest sources of error in velocity determinations. As a result, statics correction are almost universally employed in processing seismic data.

Greatly needed are computationally efficient techniques for identifying the existence and locations of anomalies causing statics errors and for assessing the effectiveness of statics correction applied to the seismic data.

SUMMARY OF THE INVENTION

In accordance with the invention, there is provided a method of generating a record of coherency in a trial $V_s$-CDPI (trial stacking velocity-common depth point index) domain.

The method first requires determining seismic traveltime and CDPI (T,I) for each of a plurality of common depth point (CDP) stacked seismic traces having respective seismic events (wavelets) representative of a single horizon in a traveltime-CDPI domain. Then the method evaluates coherency for each CDP gather used in generating the CDP stacked seismic section for a plurality of trial stacking velocities $V_s$ and for a plurality of times in a range of time from $T+t_g$ to $T-t_g$ for each (T,I) determined in the preceding step for a respective CDP gather where $t_g$ is representative of a predominant period of the horizon reflection event or wavelet for which (T,I) is determined, thus producing a plurality of datasets $(T,I,V_s,C)$ for the single horizon. Then from the plurality of datasets $(T,I,V_s,C)$, a maximum coherency stacking velocity function is generated in a trial $V_s$-CDPI domain for use in selecting a velocity function for effecting normal moveout correction of CDP gathers.

In accordance with the invention, there is also provided a method of evaluating statics errors. This method requires determining seismic traveltime and CDPI (T,I) for a plurality of CDP stacked seismic traces having respective seismic events or wavelets representative of at least a first and a second horizon in a time-CDPI domain. Then, for each of the horizons, the method evaluates coherency C for each CDP gather used in generating the CDP stacked seismic traces for each of a plurality of trial stacking velocities $V_s$ for a plurality of times in a range of time from $T+t_g$ to $T-t_g$ where T is determined from (T,I) determined in the preceding step for a respective CDP gather and where $t_g$ is representative of the period of the horizon reflection event (wavelet) for which (T,I) is determined, thus producing a plurality of datasets $(T,I,V_s,C)$ for each horizon. Then, a maximum coherency stacking velocity function is generated in a trial $V_s$-CDPI domain for each of the horizons and these are compared with one another to evaluate the existence and/or location of anomalies giving rise to statics errors.

According to a further aspect of the invention, the technique is used after, or both before and after, statics correction to evaluate the effectiveness of the statics correction.

According to a further aspect of the invention, the step of generating the maximum coherency stacking velocity function or the step of evaluating the existence and extent of statics errors can include the step of generating a coherency display by assigning the maximum coherency value for each CDP of each horizon of interest the same visual value for display purposes, and then displaying such assigned values for such horizon for a range of CDP's in a trial stacking velocity-CDPI domain. According to a particular embodiment of this aspect of the invention, the maximum coherency value can be assigned the same color or gray scale value and the remaining lesser values of coherency for each CDP for a horizon of interest can then be assigned other color or gray scale values representative of such remaining values of coherency. According to a further feature of this aspect of the invention, the values can be selected to enhance contrast between the value assigned maximum coherency and the value assigned lesser coherency values for a CDP.

DETAILED DESCRIPTION OF THE INVENTION

As used herein, CDPI (common depth point index) is used generally to refer to a position relative to a seismic survey line. The index I can be in terms of distance along the line, or in terms of an index number representative of position along the line. As thus used, the term is used to refer to the position on the seismic survey line, which overlays (zero offset) a subsurface reflection point (CDP) of interest.

As used herein, CDP gather or common depth point gather refers to a set of seismic traces representative of the same subsurface reflection point (CDP) whether before or after correction for normal moveout and statics.

As used herein, CDP stacked seismic trace or common depth point stacked seismic trace is used generally to refer to the traces of a CDP gather following NMO correction and stacking. Such CDP stacked seismic traces can be displayed in a traveltime-CDP domain to provide a representation of subterranean structure, i.e., a seismic section. Thus, as used herein, seismic section refers to a display representative of a section of subterranean structure of the earth in which traveltime is displayed as one axis, and CDP is displayed as the other axis and CDP stacked seismic traces are correspondingly presented. Generally, the traveltime displayed is two-way traveltime, that is, the time required for the seismic wave to travel from source to reflector and back to a receiver.

Figure 1:
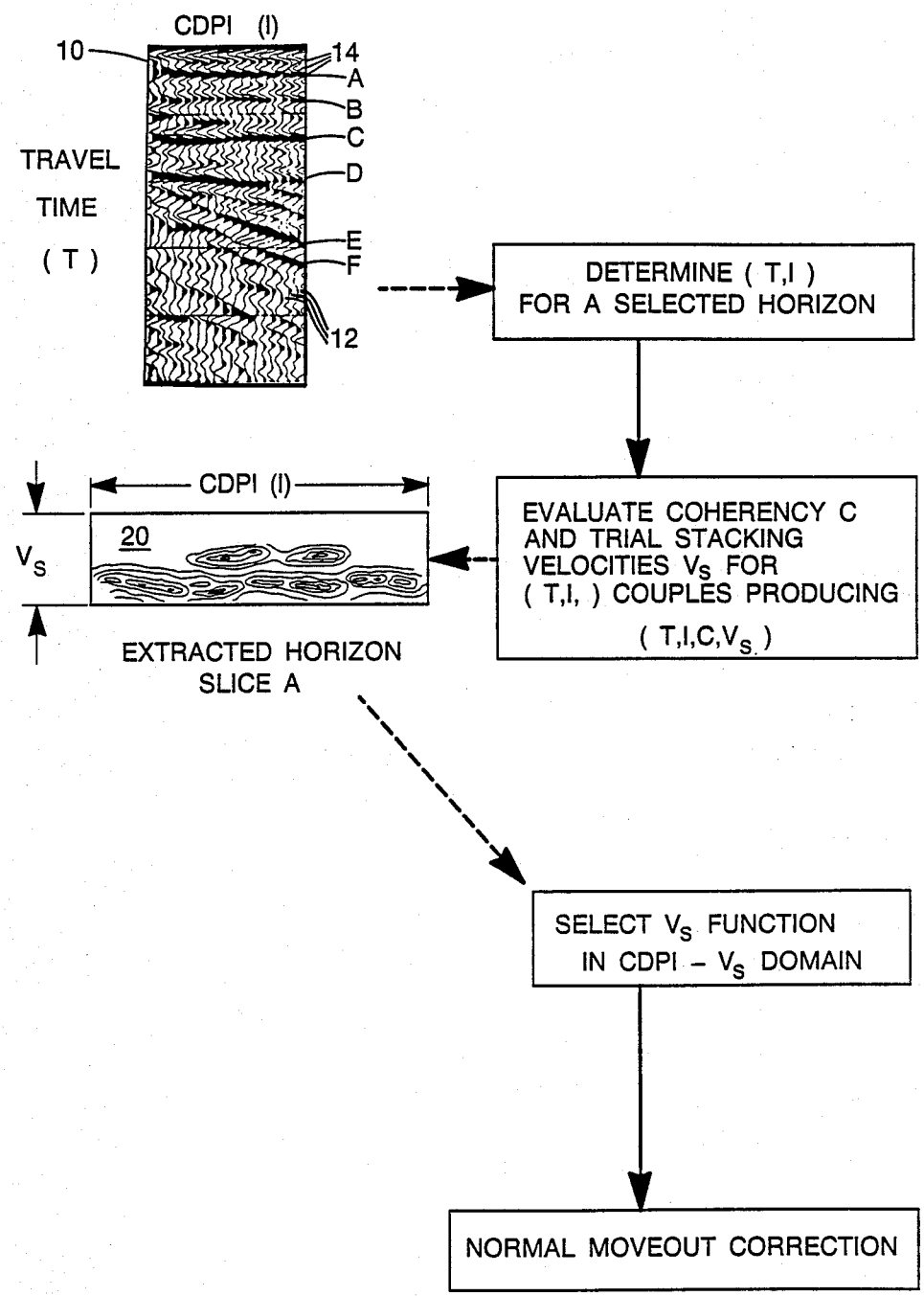
FIG. 1 illustrates a first embodiment of the invention in which the invention is used in NMO correction.
Figure 6:
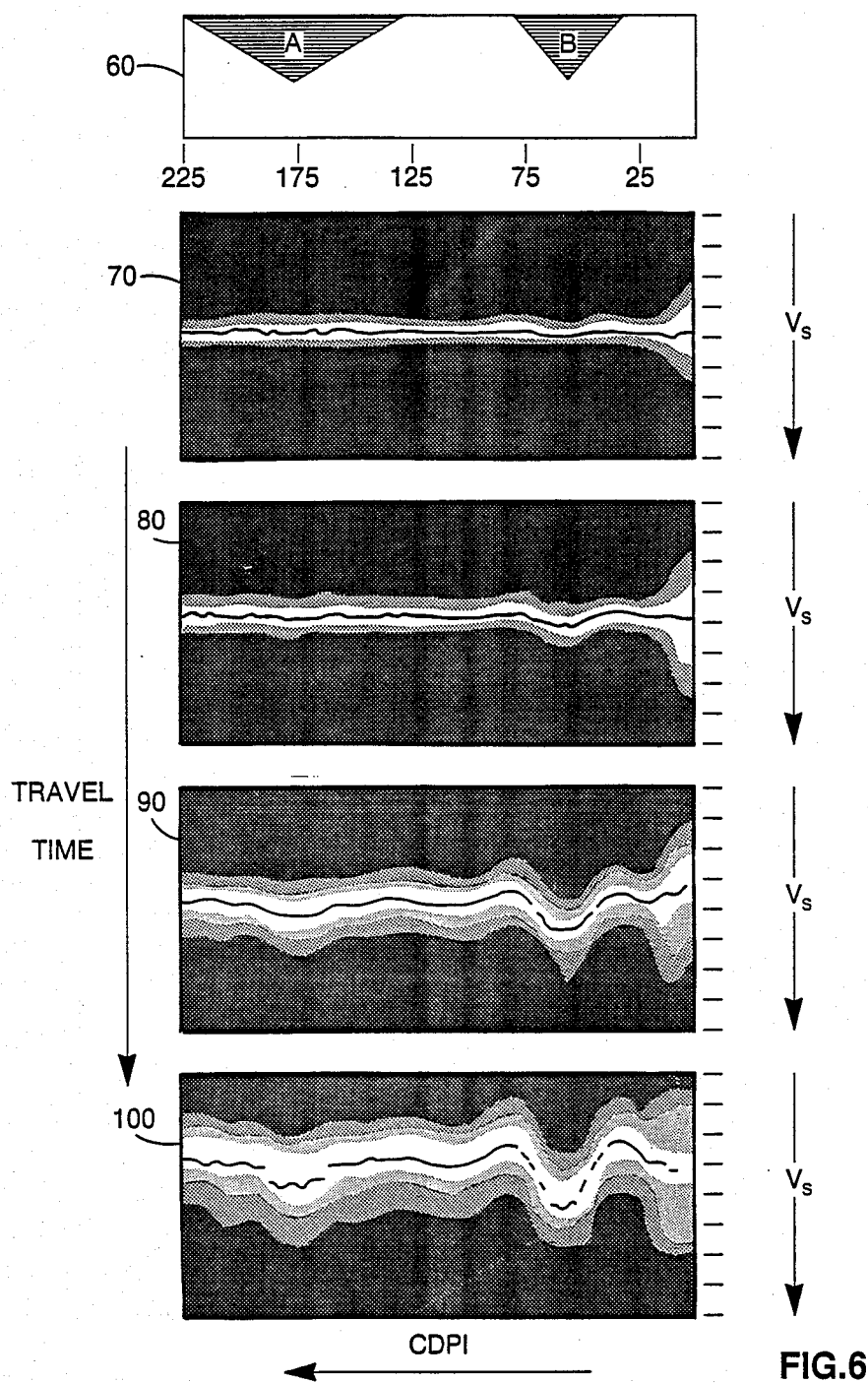
FIG. 6 illustrates schematically displays according to the invention of maximum coherency for a series of deeper horizons in the subsurface indicating the existence and location of statics errors.

Referring now to FIG. 1, FIG. 1 illustrates a first embodiment in which the invention in used in NMO correction. A display consisting of a plurality of CDP stacked seismic traces 12 in the traveltime-CDPI domain is illustrated generally as seismic section 10. The CDP stacked seismic traces so displayed have recognizable horizons A-F therein. From a record in the CDPI traveltime domain, such as record 10, traveltime and CDPI (T,I) data representative of the seismic trace reflection events or wavelets 14 Constituting a selected horizon, such as horizon A, can be determined. These values $(T_1, I_1), (T_2, I_2), \ldots, (T_i, I_i)$ are each representative of traveltime and CDPI of a selected horizon of a selected CDP stacked seismic trace and less directly are also representative of the CDP gather which was used to generate the respective CDP stacked seismic trace. Coherency values for a range of trial stacking velocities, $V_s$, is then determined using for each CDP gather the respective (T,I) data determined from record 10 producing $(T,I,C,V_s)$ datasets. These datasets can then be used to generate various displays in the trial stacking velocity, CDPI domain, as illustrated by record 20 of FIG. 1 for horizon A or as illustrated in FIG. 6 (discussed below). Using the record 20, or other records, including those residing in the data processor, those skilled in the art can select, identify, and display, in accordance with an aspect of the invention, an MCS velocity function. Using such records, those skilled in the art can also select and identify an MCS velocity function in the CDPI-$V_s$ domain which can be used for normal moveout correction of the CDP gathers which were initially used to produce the CDP stacked seismic traces, shown in record 10.

Figure 3:
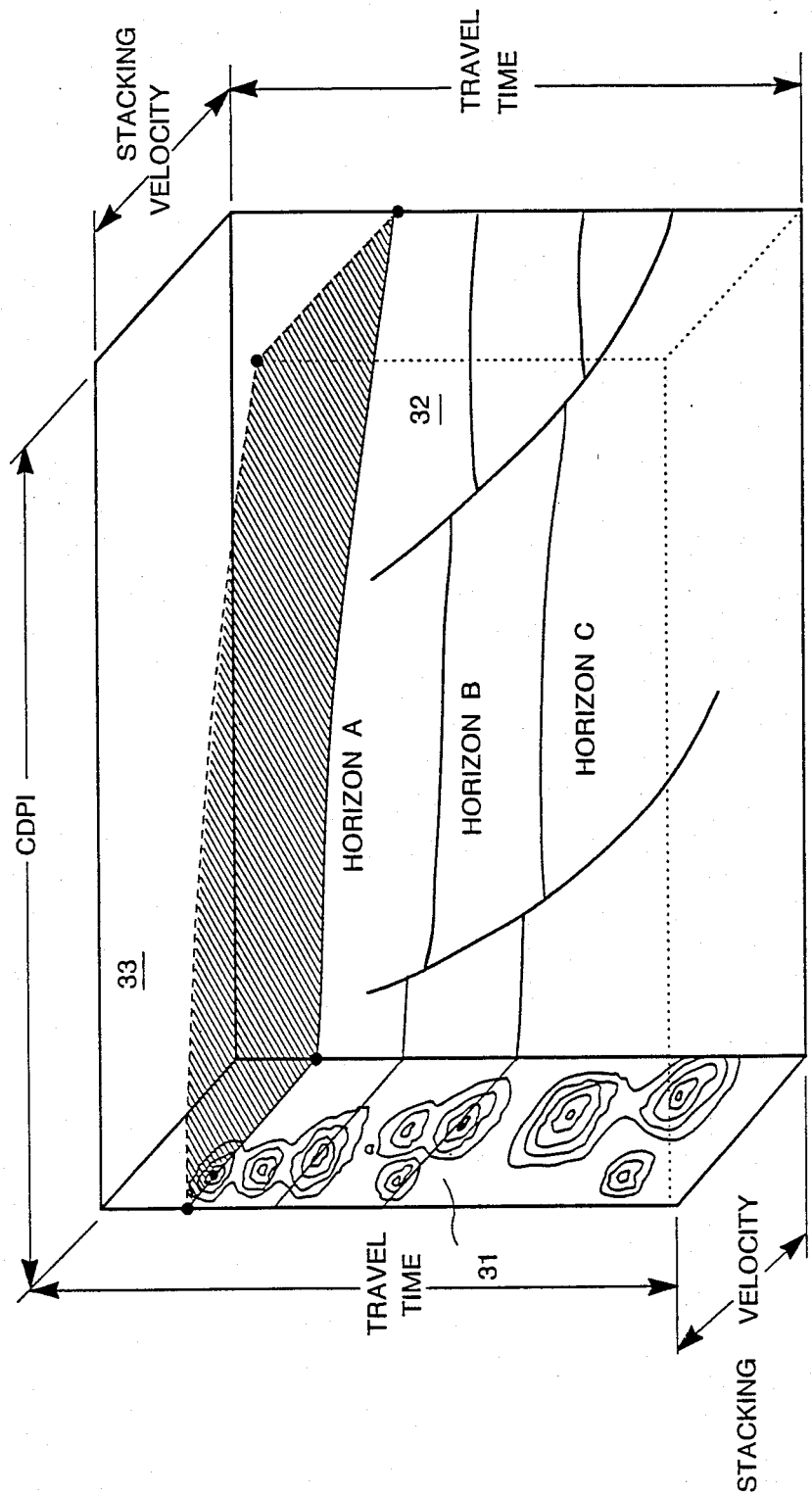
FIG. 3 illustrates a time-velocity coherence display as a surface in a three-dimensional traveltime, trial stacking velocity, CDPI domain.

The traveltime, CDPI domain (which is conventionally used to display a seismic section such as record 10) and the traveltime-trial stacking velocity domain (which is conventionally used to display a velocity spectrum) can be considered two-dimensional sections of a three-dimensional space having traveltime, trial stacking velocity, and CDPI as the dimensions. Such a space is illustrated in FIG. 3. The lateral surface 31 represents a conventional contoured velocity spectrum plot in the velocity domain (which is conventionally used), the front surface 32 represents a seismic section, and the upper surface 33 represents the CDPI-stacking velocity domain. The contoured velocity spectrum plot on lateral surface 31 can be produced in the usual way by contouring coherency in the time, velocity domain while incrementing through traveltime-trial stacking velocity ranges represented by the respective axes.

Figure 4:
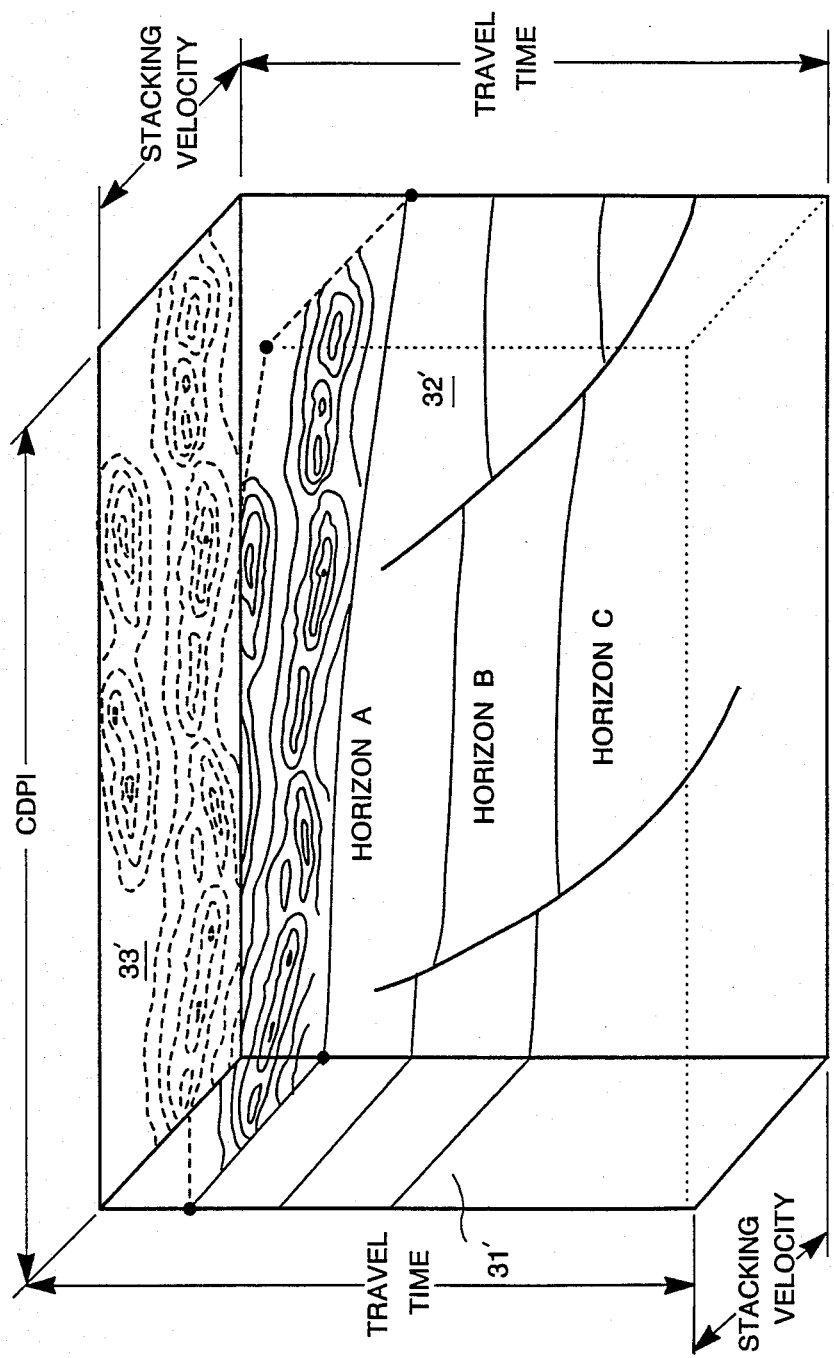
FIG. 4 illustrates a trial stacking velocity-CDPI display in a with the invention.

Coherence can also be evaluated and displayed in accordance with the invention, for example, by contouring coherence C along a horizon of interest by using the times T, trial stacking velocities $V_s$, and CDPI values characteristic of the reflection events constituting that horizon. This is done by, in effect, displaying coherence in the traveltime-CDPI domain along the horizon defined by the plurality of times $T_1, T_2, \ldots, T_i$ and CDPI $I_1, I_2, \ldots, I_i$ for a respective horizon. Thus, FIG. 4 shows coherence contours on horizon A. More typically in accordance with the invention, the horizon coherence display can be presented on a plane represented by upper surface 33 as shown in FIG. 4. This provides a lateral coherency display in which the CDPI dimension is a linear scale and is readily produced by plotting the $(I, V_s, C)$ values of the $(T, I, V_s, C)$ datasets for a selected horizon. The results are lateral coherency displays representative of trial stacking velocities in a horizon, i.e., in a CDP domain.

The velocity events of preeminent interest to seismic interpretation are those which characterize or are representative of the horizons in the subsurface. In accordance with the invention, therefore, velocity coherence data are displayed as they appear along a horizon and the velocity picks used for NMO correction are selected from a lateral coherency plot representative of a horizon.

The step of displaying the velocity coherence data as they appear along a horizon and using that data for selecting an MCS velocity function for NMO correction can be facilitated by scaling each of the coherency data points so that the maximum coherency value for each CDPI is given the same display value. In a particular aspect, by using a readily visible pigment, such as black, for the maximum coherency value and by using gray scale values which contrast with black for the values of coherency less than maximum, a continuous or broken line representative of the maximum coherence velocity data along the horizon can be generated. Alternately, and preferably, color values can be used, for example, again using black for a maximum coherency display, and then using a spectrum of color values ranging from violet through red, orange, yellow, and white for increasing values of coherency less than the maximum coherency values. Any suitable scale can be used for assigning color or gray scale values to the coherency data. It is also desirable to retain in the data processor the actual values of coherency, and to display such actual values of coherency together with the display of maximum coherency in accordance with the invention.

By using the invention, velocities can now be determined, displayed and interpreted the same way geophysicists have traditionally interpreted seismic sections, that is, laterally along horizons of interest. Further, in achieving this result, many calculations are eliminated since calculations need be made only in a narrow window about a horizon of interest. Further, the unique horizon velocity spectral display contains more information in a more useful form about a horizon of interest than multitudes of traditional velocity spectral plots. Further, the technique has the ability (a) to detect subtle lateral velocity anomalies, (b) to detect statics problems, and (c) to more easily discriminate and detect multiple interference. Further, shallower and deeper events relative to the horizon of interest which might spuriously dominate the correct positions for the coherence maximum relative to the horizons of interest are eliminated. All of these were very difficult or impossible to determine with confidence from the traditional approach to velocity analysis. Further, the velocity variations themselves along a horizon are known to have exploration significance.

According to a feature of the invention, seismic traveltime and CDPI (common depth point index) i.e., an ordered couple (T,I), are determined for each of a plurality of CDP stacked seismic traces having seismic events or wavelets representative of a single horizon in a traveltime, CDPI domain record. The predominant period of the seismic traces containing the horizon reflection events or wavelets can also be determined.

The essential requirements of the traveltime, CDPI record are that a horizon of interest be recognizable by those skilled in the art and that the information required can be determined therefrom. The time, CDPI record can thus be any seismic section produced by displaying CDP stacked seismic traces in the traveltime-CDPI domain. Preferably, the time, CDPI domain record can be, for example, such a display produced using NMO corrected CDP gathers based on regional velocity estimates or for which NMO corrections have otherwise been generated in a preliminary way by methods available to those skilled in the art. Such preliminary NMO-corrected stack sections are sometimes referred to as "brute" or "raw" stacks.

The (T,I) data for the horizon of interest can conveniently be digitized for use in data processing, for example by hand, or by using a mouse or puck and the like, as can the predominant period for the reflection events of interest constituting the horizon if such information is not already available for the area being explored.

The number of (T,I) couples to be determined for a horizon should be representative of variation in the horizon. (T,I) couples for all of the stacked CDP seismic traces having horizon representative events or wavelets can be determined for maximum information and reliability. Fewer (T,I) couples representative of the region of interest can also be selected, for example, by selecting every tenth, twentieth, fiftieth, and the like CDP stacked seismic trace having an event or wavelet contributing to the horizon of interest. It is not necessary to select such events on a regular basis since CDP location information is contained in the (T,I) couple. Hence, it can be advantageous to select events or wavelets which the explorationist desires to evaluate in accordance with the invention. It can be especially advantageous in accordance with the invention to select events characteristic of potential horizons which the explorationist desires to evaluate and to determine in accordance with the invention an MCS velocity for NMO correction with respect to that horizon.

The predominant period of the horizon events of interest can be determined as the average period of the CDP stacked seismic traces by averaging periods from a number of such traces or from visual estimation from the traveltime, CDPI record of such seismic traces.

According to a feature of the invention, coherency, C, is evaluated over a range of trial stacking velocities, $V_s$, in a range of time from $T+t_g$ to $T-t_g$ for each (T,I) couple where $t_g$ is representative of the predominant period of the horizon representative events in the CDP stacked seismic traces. Preferably, $t_g$ is selected to encompass, for example, the positive or negative peaks (wavelet half cycles) of the wavelet or event in the CDP stacked seismic trace contributing to the horizon of interest. Most preferably, this can be achieved by $t_g$ being about ¼ of the period of the wavelet for which (T,I) is determined. Broadly, $t_g$ can be in the range of about ⅛ to about 1 times such period, preferably in the range of about ¼ to about ½ of such period, most preferably, as indicated, about ¼ of such period. Such $t_g$ have been found to give advantageous results in accordance with the invention.

The coherency measure is generated for each CDP gather giving rise to the CDP stacked seismic trace from which the respective (T,I) data were determined in the preceding step. This step comprises a velocity analysis over the time range defined in accordance with the invention and over a defined trial stacking velocity range as discussed below and can be performed using available techniques and programs commercially available and known to those skilled in the art. As discussed above, in accordance with the invention, the time range is defined (1) by the values of (T,I) for the one or more horizons of interest identified and determined from the traveltime-CDPI domain record and (2) by $t_g$. Thus, in accordance with the invention, velocity analysis need be performed only for such portions of the traveltime record as are represented by $T \pm t_g$ for (T,I) values of the horizons of interest. While further description is not necessary, the following description illustrates standard techniques of velocity analysis widely known to those skilled in the art, which can be used for the horizons of interest in accordance with the present invention.

The basic scheme in velocity analysis consists of performing a stack across a CDP gather along hyperbolic trajectories defined by Eq. (1) above. To illustrate the principle of these techniques, consider the hypothetical CDP gather of FIG. 2. Suppose that a noise-free reflection in FIG. 1 forms an exact hyperbola, $H_{op}$, and that the zero offset time corresponding to the peak of the reflection is T. Suppose also that the velocity analysis is to be carried out with reference to T and that the range of velocities to be covered by the analysis is $V_a$ to $V_b$. The analysis is carried out as follows:

(1) An initial stacking velocity $V_1 = V_a$ is assumed. This velocity corresponds to hyperbola $H_1$. NMO corrections, computed form Eq. (1), are then applied. This is equivalent to aligning the traces according to hyperbola $H_1$.

(2) The degree of match (or coherency) between the traces at this alignment is measured, for example, by summing the amplitudes at T and determining the output power, i.e., the absolute value of the summation. Other measures of coherency can also be used.

(3) The velocity is then incremented by an approximate step and new NMO corrections are applied. The coherency is again measured.

(4) Step (3) is repeated until $V_b$ is reached.

(5) The zero offset time is then incremented from T. Steps (1)-(4) are repeated.

In practice, the amplitude summation (or any other coherency measure) is carried out within a time gate $t_g$ as discussed above or, alternatively, the amplitude summation can be done time sample by time sample and the results averaged over a time gate $t_g$.

The range of trial stacking velocities $V_s$ evaluated during velocity analysis for a particular time or time range can be determined as is well known to those skilled in the art to give a sufficient number of $V_s$ to avoid missing the significant events or wavelets of interest in the seismic traces. Generally, $V_s$ can be evaluated at velocity intervals of 100-200 ft/sec or preferably even more frequently across a range sufficient to encompass the velocity range covered by the data being interpreted. The velocity range can be estimated from known regional velocity functions and different velocity functions can be specified for different traveltime intervals, all as is known to those skilled in the art of velocity analysis.

In some algorithms, it is the NMO, or slowness, or the like, not the stacking velocity, that is linearly incremented in step (3).

Since the analysis is performed for each CDP gather used to generate a CDP stacked seismic trace for which (T,I) is determined, a plurality of data sets $(T,V_s,C)$ are generated for each CDP gather having a given index position. Since these datasets are indexed to the CDPI, the effect is a plurality of datasets $(T,I,V_s,C)$.

Various measures of coherency have been made and are known to those skilled in this art, including amplitude summation, cross correlation, which can be statistically or energy normalized, determination of semblance, and the like. All of these measures of coherence and others can be used in the practice of the invention.

Figure 2:
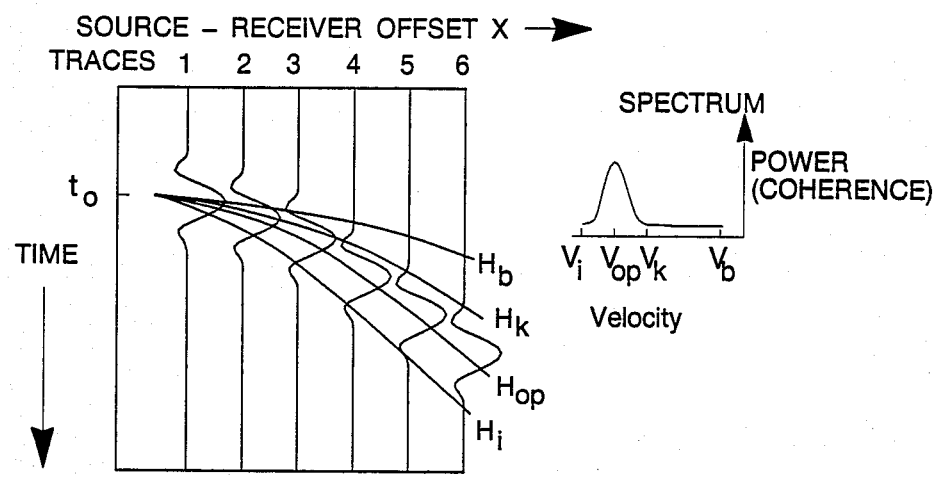
FIG. 2 illustrates velocity analysis of a CDP gather to give a measure of coherency.

The results of analysis in steps (1)-(4) can be displayed as a plot of coherency measure (for example, power) vs velocity or can be maintained as a record in a data processor or can otherwise be displayed. A new display as illustrated for T in FIG. 2 can be produced at every time increment, so that the analysis of the whole CDP record might be displayed as a series of these displays. The display of FIG. 2 illustrates the increase in power buildup as the stacking velocity increases from $V_1$ and the traces are gradually brought in phase. Maximum power (maximum coherency) is attained when all the traces become exactly in phase, i.e., when the stacking velocity reaches a value that corresponds to the hyperbola $H_{op}$. This is the MCS velocity value. As higher velocities are applied, the traces begin to get out of phase again and the power diminishes.

Velocity spectra are the most common form of displaying the results of velocity analysis. Conventionally, in these displays, the coherency value as a function of time and velocity is represented on plots with time varying along one axis and velocity varying along the other. These displays are frequently accompanied by numerical tables of the measured coherency values for verifying the MCS velocity estimate from the display. Various forms of display are used varying from wiggle trace displays in which successive measures of coherence for successive values of T are shown over a range of T to displays consisting of contours of equal coherency values in the time-velocity domain to variable density displays in which coherency values are shown by variations in density.

In accordance with a feature of the invention, the step of generating the maximum coherency stacking velocity function or the step of evaluating the existence and location of statics errors discussed below can include the step of generating a coherency display by assigning the maximum coherency values for each CDP the same value for display purposes and then displaying such assigned values for a range of CDP's in a trial stacking velocity CDPI domain.

The maximum coherency value can be assigned, for example, a uniform color value such as black and the remaining lesser values of coherency can then be assigned other color or gray scale values representative of the relationship of the individual measures of coherency to the maximum coherency value for each CDP. The various display values can preferably be selected to enhance contrast between the value assigned a maximum coherency value and the value assigned lesser coherency values for a CDP. The scale or relationship between coherency values and display values can be linear, nonlinear, or otherwise determined so long as the basis of the scale is known to the user.

According to a feature of the invention from the plurality of datasets $(T,I,V_s,C)$, a person skilled in the art can determine a $V_s$ stacking function for effecting normal moveout correction of the CDP gathers which when stacked to produce CDP stacked seismic traces and displayed in the time CDPI domain can produce a seismic section such as record 10 in FIG. 1.

According to a feature of the invention, this step of determining the $V_s$ stacking function is performed using the coherency display in the stacking velocity-CDPI domain. Since the coherency display shows variations in velocity along the horizon of interest, the velocity picks can readily be made consistent along the horizon of interest. By contrast, when using the usual coherence spectra in the time-velocity domain, many spectra along the seismic line must be generated and displayed and compared in an effort to achieve what can be achieved with a single horizon contoured display in accordance with the invention. Except that the coherency record is produced along a horizon in accordance with the invention, the step of determining the selected velocity functions is well within the skill of one of ordinary skill in the art. Thus, it is envisioned that picking of stacking velocity functions using contoured displays, wiggle trace displays, density displays, with or without fairway editing, and other techniques used by those skilled in the art for picking of stacking velocities from velocity spectra can be employed with the invention.

A method according to the invention can be used to demonstrate the existence and location of statics errors in the CDP gathers used in generating a stacked seismic section. The invention can also be used to quality control the effectiveness of statics corrections. For example, statics corrections can be employed. Then, the results can be evaluated in accordance with the invention for statics anomalies in the velocity coherence spectrum in accordance with the invention. The existence of statics anomalies can be determined by observing fluctuations in the MCS velocity function in horizons representative of the subsurface below the location of the anomaly giving rise to the statics errors.

The effect of residual statics errors on stacking velocity is a well-known phenomenon. For near surface anomalies, stacking velocity anomalies are linearly related to the near surface interval velocity variations due to the anomalies. Errors in residual statics of ±12 milliseconds (ms) within the cable length and can easily cause variations of 750 ft/sec in the stacking velocity.

If the anomaly is not located near the surface, the situation is more complicated. A narrow anomaly in the subsurface will have the same effect as a wider anomaly at the surface for a given CDPI. The wider the anomaly, the wider the effect of its surface equivalent error will be for a given horizon for a given CDPI. For a given deep seated anomaly, horizons below but near that anomaly, will be affected over a smaller range of CDPI positions than deeper horizons. Also, horizons at different depths will have a different number of traces for a given CDPI affected by a deep seated anomaly, but all horizons will be identically affected by a surface anomaly. All of these characteristics and others known to those skilled in the art can be evaluated by generating displays in accordance with the invention.

Figure 5:
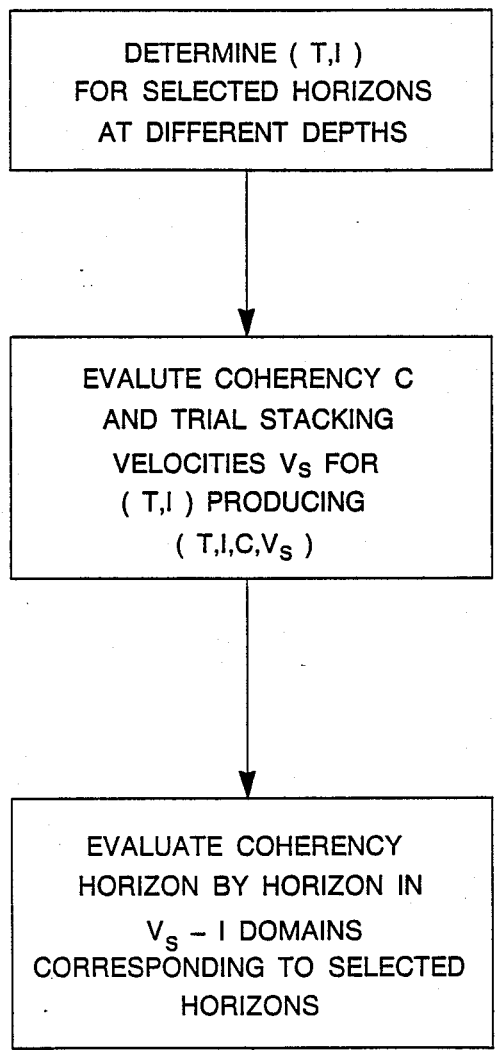
FIG. 5 illustrates schematically a second embodiment of the invention in which the invention is used to identify the existence and extent of statics errors.

Referring now to FIG. 5, FIG. 5 represents an embodiment in which the invention is used in evaluating the existence and location of statics errors. According to this aspect of the invention, (T,I) couples are determined in accordance with the invention for a plurality of selected horizons at different depths. Then, the coherency and trial stacking velocities $(C,V_s)$ for each time T are evaluated in accordance with the invention producing $(T,I,C,V_s)$ datasets for each horizon of interest. Then, coherency is evaluated horizon by horizon in the traveltime-CDPI domain to determine the existence and extent of fluctuations in MCS velocity function representative of statics errors.

According to this aspect of the invention, a plurality of horizons are analyzed and displayed in accordance with the invention. Then, the horizon displays are compared to determine which, if any, horizons show anomalies in MCS velocity function representative of statics errors. Where such anomalies are present in deeper horizons, but absent in shallower horizons, this is indicative of a subsurface inhomogeneity or anomaly located between the horizons where such effect is absent and the horizons where such effect is present. Where such anomalies are present in all horizons, it is indicative of the anomaly being present at the surface or near subsurface.

The number of horizons to be evaluated in accordance with the invention can vary depending on what other information is known concerning the subsurface in the area being explored. Clearly, for NMO corrections, at least one horizon must be evaluated in accordance with the invention. Equally clearly, at least two horizons are necessary to evaluate whether anomalies in MCS velocity function representative of statics anomalies are present. Typically, more than two will be required to provide the interpreter with sufficient information concerning the variability of the velocity field in the area being explored to identify fluctuations representative of statics errors. Typically, at least 8–12 horizons will be used. Thus, broadly, the number of horizons can be from about 2 to about 30 or more horizons, preferably in the range of about 8 to about 30 horizons for effective identification of fluctuations in MCS velocity function representative of statics errors and for location in the subsurface of the structural anomalies, giving rise to such statics errors.

A very significant advantage in accordance with the invention is its reduced data processing requirement. For example, where 10 horizons of interest are being evaluated in accordance with the invention, velocity analysis need be performed for a range of times of, for example, 10×48 msec timegate =480 msec for a seismic section where conventional velocity analysis will require from 1000 to 10,000 msec of velocity analysis depending on the seismic section being analyzed. Even where as many as 30 horizons are being evaluated, the resulting savings in data processing requirements are apparent when compared with the requirements for a conventional analysis.

Referring now in detail to FIG. 6 illustrated generally at 60 is a region of seismic exploration characterized by statics-causing zones A and B in the surface or near subsurface having one or two spread lengths extent, respectively. The effects of the statics errors themselves are modeled and displayed using the displays in accordance with the invention in displays 70, 80, 90, and 100, respectively representative displays of MCS velocity (shown in black) in trial stacking velocity-CDPI domains at increasingly deeper horizons in the earth.

The MCS velocity function is displayed as the black line, sometimes broken, in the approximate center of each horizon slice. The next highest range of coherency values is shown as white, and lesser ranges of values are shown as shades of gray increasing to near black for lesser ranges of coherency values.

Statics anomalies are increasing perturbations or oscillations in the MCS velocity function at deeper horizons in the subsurface at locations in the CDPI dimension occurring consistently in the subsurface from one horizon to another. From FIG. 6, it can be seen that MCS velocity fluctuations in one horizon of the subsurface correspond in CDPI location to those of other horizons and also to the statics-causing anomalies indicated generally at 60.

It can be seen that the longer spread length statics of anomaly B result in less perceptible perturbations in the maximum coherency function displayed than the shorter spread lengths statics of anomaly A; however, even in the case of longer spread length errors, such anomalies may be made apparent in the deeper horizons by using displays in accordance with the invention. The statics causing zones which have lesser spread lengths are correspondingly more visible as fluctuations in the MCS velocity function in the displays produced in accordance with the invention.

FIG. 6 illustrates increasingly visible perturbations in MCS velocity functions at deeper depths. FIG. 6 can also be used to illustrate use of the invention to locate structural anomalies in the subsurface giving rise to statics errors by supposing that horizon display 70 is representative of the first subsurface horizon in which such anomalies are seen and that shallower horizons (not shown) do not evidence such anomalies. In this event, the structural anomaly in the subsurface is indicated to be present above horizon 70 and below the deepest shallower horizon not showing such anomalies. Of course, as directly illustrated by FIG. 6, if all horizons show MCS velocity function perturbations representative of statics anomalies, then the structural anomaly is indicated to be located at the surface or in the near subsurface.

In accordance with an aspect of the invention, statics correction programs can be utilized and the effectiveness of their can be evaluated by analysis in accordance with the invention and by displays in accordance with the invention.

Such use can demonstrate the existence of uncorrected topographic variations as well as of subsurface inhomogeneities. This can be accomplished, by applying statics corrections to CDP gathers prior to, or subsequent to, or both before and after using the technique of the invention for identification of the existence and location of statics errors. Thus, the invention can be readily used to quality control statics correction.

The invention has been described in terms of preferred embodiments and special applications; however, the invention is not so limited but is defined by the scope of the claims appended hereto.

What is claimed is:

1. A method of generating a record of coherency in a trial stacking velocity-CDPI (common depth point index) domain comprising:
   determining seismic traveltime and CDPI (T,I) for each of a set of common depth point (CDP) stacked seismic traces, each (T,I) thus determined being representative of an event in a representive CDP stacked seismic trace corresponding to a single horizon of the set of CDP stacked seismic traces displayed in a traveltime-CDPI domain;
   evaluating coherency C of a set of CDP gathers used in generating the set of CDP stacked seismic traces for a plurality of trial stacking velocities $v_s$ for a plurality of times from $T+t_g$ to $T-t_g$, where T is determined for a CDP gather by (T,I) for a respective CDP stacked seismic trace determined by the preceding step of this claim, and where $t_g$ is representative of the horizon-representative event in each CDP stacked seismic trace for which (T,I) is determined, thus producing a plurality of datasets $(T,I,V_s,C)$;
   from the plurality of datasets $(T,I,V_s,C)$ selecting a maximum coherence stacking velocity function for effecting normal moveout correction of CDP gathers.

2. The method of claim 1 further comprising:
   repeating the steps for each of a plurality of horizons of the set of CDP stacked seismic traces displayed in a traveltime-CDPI domain.

3. The method of claim 2 wherein:
   the plurality of horizons comprises in the range of 1 to 30 horizons.

4. The method of claim 2 wherein:
   the plurality of horizons comprises in the range of 8 to 30 horizons.

5. The method of claim 1 wherein the step of selecting a maximum coherence stacking velocity function includes a step of generating a display of coherency in the trial stacking velocity-CDPI domain by assigning to a maximum coherency value for each CDPI the same value for display purposes, and then displaying such assigned values in the trial stacking velocity-CDPI domain.

6. The method of claim 5 further comprising assigning the maximum coherency value for each CDPI a uniform color value and assigning lesser values of coherency for each CDPI other color values representative of a relationship of the individual values of coherency for each CDPI to the maximum coherency value for each CDPI.

7. The method of claim 5 comprising assigning a uniform display value to the maximum coherency value for each CDPI and assigning the remaining lesser values of coherency for each CDPI other display values on a gray scale, the display value assigned to the maximum of such remaining lesser values being selected for contrast with the display value assigned to the maximum coherency value.

8. The method of claim 5 wherein:
   $t_g$ is about ¼ period of the event representative of a horizon in a CDP stacked seismic trace; and wherein
   the determining, evaluating and selecting steps are performed for only that portion of time which the number of horizons evaluated times ½ $t_g$ bears to the total traveltime of events of interest in the CDP stacked seismic traces.

9. The method of claim 1 wherein:
   $t_g$ is in the range of about ⅛ to about 1 times the period of the events representative of a horizon in a CDP stacked seismic trace.

10. The method of claim 1 wherein:
    $t_g$ is in the range of about ¼ to about ½ times the period of events representative of a horizon in a CDP stacked seismic trace.

11. A method of evaluating statics errors comprising:
    determining seismic traveltime and CDPI (T,I) for each of a set of common depth point (CDP) stacked seismic traces, each (T,I) thus determined being representative of an event in a respective CDP stacked seismic trace corresponding to a single horizon of the set of CDP stacked seismic traces displayed in a travel time-CDPI domain;
    repeating the preceding step for each of a plurality of horizons of the set of CDP stacked seismic traces displayed in a traveltime-CDPI domain;
    for each of the plurality of horizons, evaluating coherency C for each of a set of CDP gathers used in generating said CDP stacked seismic traces for a plurality of trial stacking velocities $v_s$ for a plurality of times from $T+t_g$ to $T-t_g$ for each (T,I) for a given horizon, where T is determined for a given horizon-respective event of a CDP gather by (T,I) determined for a respective CDP stacked seismic trace determined by the preceding step of this claim, and where $t_g$ is representative of the period of the horizon representative event for which (T,I) is determined, thus producing a plurality of datasets $(T,I,V_s,C)$ for each of the plurality of horizons;
    then comparing the plurality of datasets characteristic of each horizon with those characteristic of the other horizons to determine fluctuations in maximum coherency stacking velocity representative of static error.

12. The method of claim 11 further comprising:
    after the comparing step, performing statics correction of traces constituting the CDP gathers; and then
    repeating the determining, repeating, evaluating and comparing steps.

13. The method of claim 11 further comprising:
    prior to the determining steps correcting traces constituting CDP gather for statics correction.

14. The method of claim 11 wherein: the plurality of horizons comprises in the range of 2 to 30 horizons.

15. The method of claim 11 wherein:
    the plurality of horizon comprises in the range of 8 to 30 horizons.

16. The method of claim 11 wherein the evaluating step is performed only for times T determined in the determining and repeating steps for the plurality of horizons.

17. The method of claim 11 including a step of generating a display of coherency in the trial stacking velocity-CDPI domain by assigning to a maximum coherency value for each CDPI the same value for display purposes, and then displaying such assigned values horizon-by-horizon in the trial stacking velocity-CDPI domain.

18. The method of claim 17 further comprising assigning the maximum coherency value for each CDPI a uniform color value and assigning lesser values of coherency for each CDPI other color values representative of a relationship of the individual values of coherency for each CDPI to the maximum coherency value for each CDPI.

19. The method of claim 17 comprising assigning a uniform display value to the maximum coherency value for each CDPI and assigning the remaining lesser values of coherency for each CDPI other display values on a gray scale, the display value assigned to the maximum of such remaining lesser values being selected for contrast with the display value assigned to the maximum coherency value.

20. The method of claim 11 wherein:
$t_g$ is in the range of about $\frac{1}{8}$ to about 1 times the period of the event representative of a horizon in a CDP stacked seismic trace.

21. The method of claim 20 wherein:
$t_g$ is in the range of about $\frac{1}{4}$ to about $\frac{1}{2}$ times the period of the event representative of a horizon in a CDP stacked seismic trace.

22. The method of claim 20 wherein:
$t_g$ is about $\frac{1}{4}$ the period of the event representative of a horizon in a CDP stacked seismic trace; and wherein
the evaluating step is performed for only that portion of time which the number of horizons evaluated times $\frac{1}{2}$ $t_g$ bears to the total traveltime of events of interest in the set of CDP stacked seismic traces.

* * * * *